US012682657B2

(12) United States Patent (10) Patent No.: US 12,682,657 B2
Elamir et al. (45) Date of Patent: Jul. 14, 2026

(54) ASSOCIATING OBJECT DETECTIONS FOR SENSOR DATA PROCESSING IN AUTONOMOUS SYSTEMS AND APPLICATIONS

(71) Applicant: NVIDIA Corporation, Santa Clara, CA (US)

(72) Inventors: Mohamed Shawki Elamir, Dornstadt (DE); Arthur Henry Rajala, Anniston, AL (US); Wongun Choi, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 133 days.

(21) Appl. No.: 18/628,439

(22) Filed: Apr. 5, 2024

(65) Prior Publication Data

US 2025/0316090 A1 Oct. 9, 2025

(51) Int. Cl.
| | |
|---|---|
| *G06V 10/00* | (2022.01) |
| *B60W 60/00* | (2020.01) |
| *G01C 21/00* | (2006.01) |
| *G05D 1/246* | (2024.01) |
| *G06T 7/70* | (2017.01) |
| *G06V 10/764* | (2022.01) |
| *G06V 10/77* | (2022.01) |
| *G06V 20/58* | (2022.01) |

(52) U.S. Cl.
CPC .......... *G06V 20/58* (2022.01); *B60W 60/001* (2020.02); *G01C 21/3837* (2020.08); *G05D 1/246* (2024.01); *G06T 7/70* (2017.01); *G06V 10/764* (2022.01); *G06V 10/7715* (2022.01);

*B60W 2420/54* (2013.01); *B60W 2556/40* (2020.02); *G06T 2207/30261* (2013.01)

(58) Field of Classification Search
CPC .. G06V 20/58; G06V 10/7715; G06V 10/764; G06T 7/70; G06T 2207/30261; G01C 21/3837; G05D 1/246; B60W 2556/40; B60W 60/001; B60W 2420/54
USPC .......................................................... 701/25
See application file for complete search history.

(56) References Cited

U.S. PATENT DOCUMENTS

| | | | |
|---|---|---|---|
| 9,747,527 B2 | 8/2017 | Baranowski et al. | |
| 11,074,717 B2 | 7/2021 | Tremblay et al. | |
| 11,210,537 B2 | 12/2021 | Koivisto et al. | |
| 11,670,001 B2 | 6/2023 | Mousavian et al. | |
| 11,989,642 B2 | 5/2024 | Villegas et al. | |

(Continued)

*Primary Examiner* — Tiffany P Young
(74) *Attorney, Agent, or Firm* — IRON SUMMIT IP LLP

(57) ABSTRACT

In various examples, associating object detections for sensor data processing for autonomous and semi-autonomous systems and applications is described herein. Systems and methods described herein may group object detections (e.g., echoes, etc.) that are detected using multiple sensors (e.g., ultrasonic sensors, sonar sensors, etc.) and then use the groupings to process the object detections to perform one or more tasks, such as object or feature detection. In some examples, the object detections are grouped using one or more configurations, such as an order associated with analyzing sensor data generated using the sensors and/or threshold distances associated with determining that object detections are associated with the same object. Additionally, a respective group may be generated for one or more (e.g., each) detected object such that the locations of the object surrounding the machine may be determined.

20 Claims, 14 Drawing Sheets

(56) References Cited

U.S. PATENT DOCUMENTS

| 2017/0282915 A1* | 10/2017 | Kim | ..................... B60W 30/08 |
| 2018/0239017 A1* | 8/2018 | Milschewski | ............. G01S 7/53 |
| 2022/0261593 A1 | 8/2022 | Yu et al. | |

* cited by examiner

500

OBTAIN FIRST SENSOR DATA GENERATED USING A FIRST ULTRASONIC
SENSOR OF A MACHINE AND SECOND SENSOR DATA GENERATED USING
A SECOND ULTRASONIC SENSOR OF THE MACHINE
B502

DETERMINE, BASED AT LEAST ON THE FIRST SENSOR DATA INDICATING
A FIRST OBJECT DETECTION ASSOCIATED WITH A FIRST DISTANCE FROM
THE MACHINE, TO ASSOCIATE THE FIRST OBJECT DETECTION WITH A
GROUP CORRESPONDING TO AN OBJECT
B504

DETERMINE THAT THE SECOND SENSOR DATA INDICATES A SECOND
OBJECT DETECTION ASSOCIATED WITH A SECOND DISTANCE FROM THE
MACHINE
B506

DETERMINE, BASED AT LEAST ON THE SECOND DISTANCE BEING WITHIN
A THRESHOLD DISTANCE TO THE FIRST DISTANCE, TO ASSOCIATE THE
SECOND OBJECT DETECTION WITH THE GROUP
B508

DETERMINE, BASED AT LEAST ON THE GROUP AND USING AT LEAST THE
FIRST OBJECT DETECTION AND THE SECOND OBJECT DETECTION, A
LOCATION ASSOCIATED WITH THE OBJECT
B510

CAUSE, BASED AT LEAST ON THE LOCATION ASSOCIATED WITH THE
OBJECT, THE MACHINE TO PERFORM ONE OR MORE OPERATIONS
B512

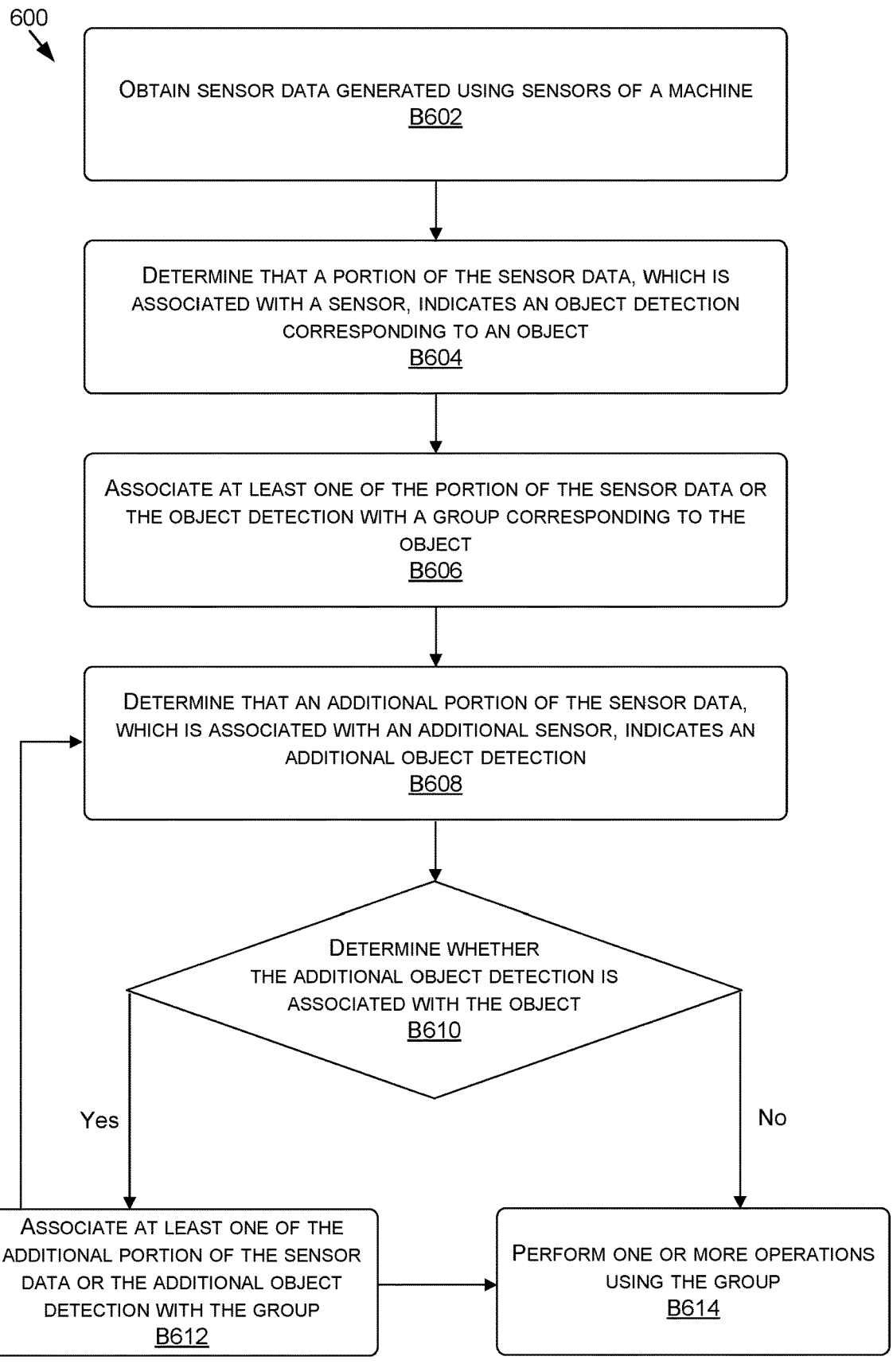

OBTAIN SENSOR DATA GENERATED USING SENSORS OF A MACHINE
B602

DETERMINE THAT A PORTION OF THE SENSOR DATA, WHICH IS ASSOCIATED WITH A SENSOR, INDICATES AN OBJECT DETECTION CORRESPONDING TO AN OBJECT
B604

ASSOCIATE AT LEAST ONE OF THE PORTION OF THE SENSOR DATA OR THE OBJECT DETECTION WITH A GROUP CORRESPONDING TO THE OBJECT
B606

DETERMINE THAT AN ADDITIONAL PORTION OF THE SENSOR DATA, WHICH IS ASSOCIATED WITH AN ADDITIONAL SENSOR, INDICATES AN ADDITIONAL OBJECT DETECTION
B608

DETERMINE WHETHER THE ADDITIONAL OBJECT DETECTION IS ASSOCIATED WITH THE OBJECT
B610

Yes                                                                No

ASSOCIATE AT LEAST ONE OF THE ADDITIONAL PORTION OF THE SENSOR DATA OR THE ADDITIONAL OBJECT DETECTION WITH THE GROUP
B612

PERFORM ONE OR MORE OPERATIONS USING THE GROUP
B614

ASSOCIATING OBJECT DETECTIONS FOR SENSOR DATA PROCESSING IN AUTONOMOUS SYSTEMS AND APPLICATIONS

BACKGROUND

Generating maps or other environmental representations—such as free-space maps and occupancy maps—is essential for autonomous and/or semi-autonomous machine navigation. For instance, these dynamically generated representations of the environment may include a birds-eye-view (BEV) perspective of an area surrounding a machine, where the BEV representation indicates locations of static and/or dynamic objects that are proximate to the machine and/or indicates drivable (e.g., free-space) and non-drivable regions of the environment. As such, the machine may use these representations to determine the locations of the objects within the environment as well as where the machine is capable of navigating, and may use this information to determine planning and control operations for navigating safely through the environment.

In some examples, conventional systems may use specific types of sensor data to generate these representations, such as ultrasonic data generated using ultrasonic sensors of a machine. Based on the one-dimensional outputs represented by ultrasonic data, the conventional systems may need to group object detections (e.g., echoes) detected using multiple ultrasonic sensors, where the grouped object detections are then processed to determine locations of objects within an environment. As such, these conventional systems may use various techniques to perform the grouping. For instance, a conventional system may use a brute force technique where the conventional system processes every combination of object detections detected using the ultrasonic sensors. While such a technique may determine all locations of objects located within the environment, this technique may also require a large amount of computing resources and/or latency based on the amount of ultrasonic data and/or the number of object detections that need to be processed.

As such, another conventional system may use a closest object technique where only the closest object detections represented by the ultrasonic data are processed using every combination in order to identify the objects that are located close to a machine. For instance, if a first object is located closer to a machine as compared to a second object, where both objects are detected using the same ultrasonic sensors, then the conventional system may only process specific object detections to determine the location of the first object. As such, while such a technique may determine the locations of the closest objects located within the environment while also reducing the amount of computing resources needed for processing as compared to the brute force technique, this technique may not determine the locations of certain objects within the environment, such as objects that are located behind other objects. As such, the machine may not have all of the information needed for navigating, such as the locations of all surrounding objects.

As such, another conventional system may use a dividing technique that groups ultrasonic sensors based on the locations of the ultrasonic sensors on a machine. For example, the conventional system may group the ultrasonic sensors located on the front-left of the machine in a first group, the ultrasonic sensors located on the front-right of the machine in a second group, and/or so forth. The conventional system may then use the groups such that object detections that are detected by a group of ultrasonic sensors is processed without processing object detections that are detected using other ultrasonic sensors. While this technique may detect the locations of objects located at various distances from the machine while also reducing the amount of computing resources needed for processing as compared to the brute force technique, this technique may not detect objects that are located between groups of ultrasonic sensors. As such, the machine may again not have all of the information needed for navigating, such as the locations of all surrounding objects.

SUMMARY

Embodiments of the present disclosure relate to associating object detections for sensor data processing for autonomous and semi-autonomous systems and applications. Systems and methods described herein may group object detections (e.g., echoes, etc.) that are detected using multiple sensors (e.g., ultrasonic sensors, sonar sensors, etc.) based at least on one or more configurations—such as based on an order of the sensors and/or threshold distances between the object detections—and then use the groupings to process the object detections to perform one or more tasks, such as object detection. For instance, sensor data generated using a sensor may be processed to determine that the sensor data indicates an object detection. Based on one or more configurations, additional sensor data generated using one or more additional sensors may then be processed to determine whether the additional sensor data represents one or more object detections for the same object-such as by using one or more distance thresholds. These object detections may then be grouped, where the grouped object detections are then processed to determine at least a location of the object within an environment. Additionally, similar processes may be used to determine additional groups of object detections and/or additional locations of objects within the environment.

In contrast to conventional systems, such as conventional systems that perform a brute force technique, the systems of the present disclosure group the object detections and then use the groups to process the object detections. As described herein, this may reduce the amount of computing resources needed to process the sensor data, since all combinations of object detections do not need to be processed, while still allowing for detection of all objects surrounding a machine. Additionally, in contrast to the conventional systems, such as conventional systems above that perform the closest object technique, the systems of the present disclose are able to generate groups associated with objects located at various distances from the machine and then use the groups to determine the locations of these objects. This way, objects that are located proximate to the machine, as well as objects that located behind those objects and/or a far distances from the machine, may be detected.

Furthermore, in contrast to the conventional systems, such as conventional systems that perform a dividing technique, the systems of the present disclosure group object detections using multiple factors, such as an order associated with sensors as well distance thresholding. As such, and as described in more detail herein, the systems of the present disclosure are able to dynamically generate groups using various combinations of sensors on the machine rather than using static groups that include specific (e.g., set or predetermined) sensors, as with the conventional systems. This way, the systems of the present disclose may detect objects located at any location with respect to the machine since groups may be dynamically generated for each object. As such, this provides improvements over the conventional systems in that the conventional systems may only detect objects that are located within areas of the environment that are covered by the static groups, but may not detect objects that are located within areas of the environment that are between the static groups.

BRIEF DESCRIPTION OF THE DRAWINGS

The present systems and methods for associating object detections for sensor data processing for autonomous and semi-autonomous systems and applications are described in detail below with reference to the attached drawing figures, wherein:

FIG. 5 illustrates a flow diagram showing a method for grouping object detections associated with ultrasonic data and then using the grouping to perform one or more tasks, in accordance with some embodiments of the present disclosure;

FIG. 6 illustrates a flow diagram showing a method for grouping object detections that are detected using multiple sensors, in accordance with some embodiments of the present disclosure;

DETAILED DESCRIPTION

Figure 1:
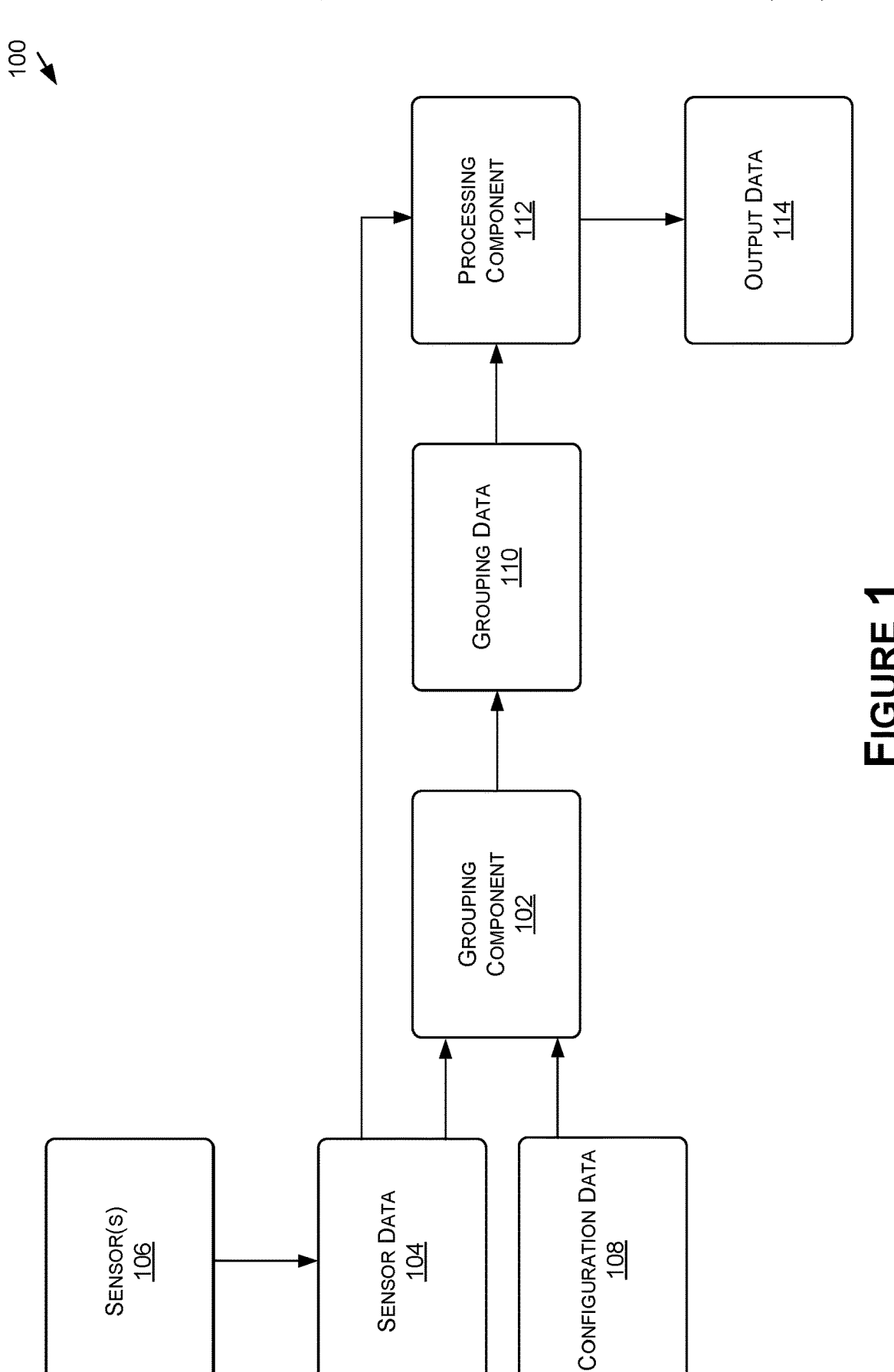
FIG. 1 illustrates an example data flow diagram for a process of grouping object detections and then using the groups to process the object detections to perform one or more tasks, in accordance with some embodiments of the present disclosure.

Systems and methods are disclosed related to associating object detections for sensor data processing for autonomous and semi-autonomous systems and applications. Although the present disclosure may be described with respect to an example autonomous or semi-autonomous vehicle or machine 700 (alternatively referred to herein as "vehicle 700," "ego-vehicle 700," "ego-machine 700," or "machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to sensor data processing and/or object detection, this is not intended to be limiting, and the systems and methods described herein may be used in augmented reality, virtual reality, mixed reality, robotics, security and surveillance, autonomous or semi-autonomous machine applications, and/or any other technology spaces where object detection and/or map creation may be used.

For instance, a system(s) may receive sensor data generated using sensors of a machine navigating within an environment. As described herein, the sensor data may include, but is not limited to, ultrasonic data generated using one or more ultrasonic sensors, sonar data generated using one or more sonar sensors, image data generated using one or more image sensors, LiDAR data generated using one or more LiDAR sensors, RADAR data generated using one or more RADAR sensors, and/or any other type of sensor data generated using any other type of sensor. As described herein, the sensor data may indicate one or more locations of one or more objects located within the environment. For instance, such as with regard to ultrasonic data, the sensor data may represent a one-dimensional representation that indicates one or more distances to the object(s). For example, the sensor data may represent a histogram that is associated with a number of bins (e.g., 50 bins, 100 bins, 200 bins, 300 bins, 320 bins, 400 bins, etc.), where each bin is associated with a respective distance within the environment. Additionally, the histogram may indicate amplitude values associated with a frequency signal, where one or more peak amplitude values (e.g., echoes) associated with the frequency signal may indicate the distance(s) of the object(s) within the environment.

The system(s) may also receive, obtain, generate, and/or store data (referred to, in some examples, as "configuration data") representing one or more configuration parameters associated with grouping different combinations of object detections (e.g., echoes, etc.) that are detected using at least the sensor data. For instance, in some examples, the configuration parameter(s) may indicate an order (e.g., a pattern, a cycle, etc.) associated with analyzing instances of the sensor data generated using different sensors. For a first example, the order may indicate a starting sensor on the machine, such as front-left sensor (and/or any other sensor), along with a direction around the machine, such as clockwise or counterclockwise. For a second example, the order may indicate a first sensor, followed by a second sensor, followed by a third sensor, followed by a fourth sensor, and/or so forth. Additionally, in some examples, the configuration parameter(s) may indicate additional information, such as a distance threshold for associating object detections (e.g., echoes), a minimum number of object detections for a group to be processed, and/or a maximum number of object detections that a group may include.

The system(s) may then use the configuration data to determine one or more groups associated with the object detections. For instance, to start a group, the system(s) may process first sensor data generated using a first sensor, such as the starting sensor as indicated by the configuration parameter(s). In some examples, when starting the group, the system(s) may only process a specific type of sensor data, such as sensor data associated with a main measurement of the first sensor. As described herein, the sensor data may be associated with a main measurement based on the first sensor both firing an output (e.g., an ultrasonic wave, etc.) and receiving an input (e.g., one or more echoes) associated with the output. However, in other examples, when starting the group, the system(s) may process multiple types of sensor data, such as sensor data associated with a main measurement as well as sensor data associated with a secondary measurement. As described herein, the sensor data may be associated with a secondary measurement based at least on another sensor firing the output, but the first sensor still receiving the input associated with the output.

In any of the examples, based at least on processing the first sensor data, the system(s) may determine whether the first sensor data represents a first object detection. For example, if the first sensor data includes ultrasonic data, then the system(s) may determine that the first sensor data represents the first object detection based at least on the first sensor data representing an echo, such as when the frequency signal satisfies (e.g., is equal to or greater than) a threshold amplitude value and/or indicates a peak. If the system(s) determines that the first sensor data does not represent the first object detection, then the system(s) may not generate a group and/or move to a next sensor using the order. However, if the system(s) determines that the first sensor data represents the first object detection, then the system(s) may generate a group corresponding to an object. Additionally, the system(s) may associate the first object detection and/or the first sensor data with the group.

The system(s) may then use the order to process second sensor data generated using a second sensor (e.g., a neighboring sensor that is in a clockwise direction with respect to the first sensor). In some examples, the second sensor data may be associated with a main measurement or a secondary measurement. Based at least on the processing, the system(s) may determine whether the second sensor data represents a second object detection (e.g., an echo) that is associated with the same object as the first object detection of the first sensor data. As described herein, in some examples, the system(s) may determine that the second object detection is associated with the same object based at least on a distance associated with the second object detection being within the threshold distance to a distance associated with the first object detection. If the system(s) determines that the second sensor data does not represent the second object detection that is associated with the same object, then the system(s) may refrain from associating the second object detection and/or the second sensor data with the group, and/or the system(s) terminate the process of generating the group. However, if the system(s) determines that the second sensor data represents the second object detection that is associated with the same object, then the system(s) may associate the second object detection and/or the second sensor data with the group.

The system(s) may then continue this technique of processing instances of sensor data generated using one or more additional sensors according to the order in order to associate one or more additional object detections and/or one or more additional instances of sensor data with the group. For instance, the system(s) may continue this technique until the system(s) processes sensor data that does not represent an object detection that is associated with the same object, until the system(s) associates the maximum number of object detections with the group, until the system(s) processes a threshold number of instances of sensor data, until the system(s) processes sensor data generated by all of the sensors, and/or until one or more additional and/or alternative events occur.

In some examples, the system(s) may then perform one or more additional and/or alternative checks on the group. For example, the system(s) may determine that the group is not valid if the group is not associated with at least the minimum number of object detections or determine that the group is valid if the group is associated with at least the minimum number of object detections. For example, if the minimum number of object detections includes three object detections, then the system(s) may determine that the group is valid as long as the group is associated with three or more object detections.

The system(s) may then process the object detections and/or the sensor data associated with the group, such as if the group is found valid, to determine information associated with the object. For instance, the system(s) may process the object detections and/or the sensor data in order to determine a location (e.g., a two-dimensional location, a three-dimensional location, a relative location, etc.) of the object within the environment, a classification associated with the object, a probability associated with the location, a probability associated with the classification, and/or any other information. In some examples, the system(s) may use various techniques to determine the information, such as by processing the sensor data and/or the object detections using one or more machine learning models, one or more neural networks, one or more algorithms, one or more modules, and/or any other processing component. For example, if the system(s) is determining the location associated with the object, then the system(s) may determine the location based at least on processing the object detections using one or more trilateration algorithms.

In some examples, the system(s) may then perform similar processes to determine information associated with any number of objects located within the environment. For a first example, if the system(s) determines that the first sensor data represents another object detection associated with another object, then the system(s) may perform similar processes to generate a group for the other object and/or use the group to determine information associated with the other object. For a second example, the system(s) may process sensor data associated with the next sensor according to the order, such as the second sensor in the examples above. If the system(s) determines that the second sensor data represents the object detection associated with the object and/or another object detection associated with another object, then the system(s) may perform similar processes to generate a group for the object and/or the other object and/or use the group to determine information associated with the object and/or the other object.

In some examples, the system(s) may perform additional processes using the information associated with the objects. For instance, the system(s) may use the information to generate a representation associated with the environment, such as an occupancy map, a height map, a distance map, and/or any other type of representation. Additionally, the system(s) may use the information and/or the representation to determine one or more operations for navigating the machine. For example, the system(s) may use the information and/or the representation to determine a trajectory for the machine and then cause the machine to navigate along the trajectory. While this is just one example of one or more operations that the system(s) may cause the machine to perform using the information and/or the representation, in other examples, the system(s) may cause the machine to perform additional and/or alternative operations.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems implementing one or more visual language models (VLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of grouping object detections and then using the groups to process the object detections to perform one or more tasks, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

The process 100 may include a grouping component 102 receiving sensor data 104 generated using one or more sensors 106 of a machine (e.g., an autonomous vehicle 700). As described herein, the sensor data 104 may include, but is not limited to, ultrasonic data 104 generated using one or more ultrasonic sensors 106, sonar data 104 generated using one or more sonar sensors 106, image data 104 generated using one or more image sensors 106, LiDAR data 104 generated using one or more LiDAR sensors 106, RADAR data 104 generated using one or more RADAR sensors 106, and/or any other type of sensor data generated using any other type of sensor. As described herein, the sensor data 104 may indicate one or more locations of one or more objects located within the environment. For instance, such as with regard to ultrasonic data, the sensor data 104 may represent a one-dimensional representation that indicates one or more distances to the object(s). For example, the sensor data 104 may represent a histogram that is associated with a number of bins (e.g., 50 bins, 100 bins, 200 bins, 300 bins, 320 bins, 400 bins, etc.), where each bin is associated with a respective distance within the environment. Additionally, the histogram may indicate amplitude values associated with a frequency signal, where one or more peak amplitude values (e.g., echoes) associated with the frequency signal may indicate the distance(s) associated with the object(s) within the environment.

The process 100 may also include the grouping component 102 receiving, obtaining, generating, and/or storing configuration data 108 representing one or more configuration parameters associated with grouping different combinations of object detections that are detected using the sensor data 104. For instance, the configuration parameter(s) may indicate an order (e.g., a pattern, a cycle, etc.) associated with analyzing instances of the sensor data 104 generated using the sensors 106. For a first example, the order may indicate a starting sensor 106 on the machine, such as front-left sensor (and/or any other sensor), along with a direction around the machine, such as clockwise or counterclockwise. For a second example, the order may indicate a first sensor 106, followed by a second sensor 106, followed by a third sensor 106, followed by a fourth sensor 106, and/or so forth. While these are just a few examples of orders that may be represented by the configuration data 108, in other examples, the configuration data 108 may represent additional and/or alternative orders associated with the sensors 106.

Figure 2:
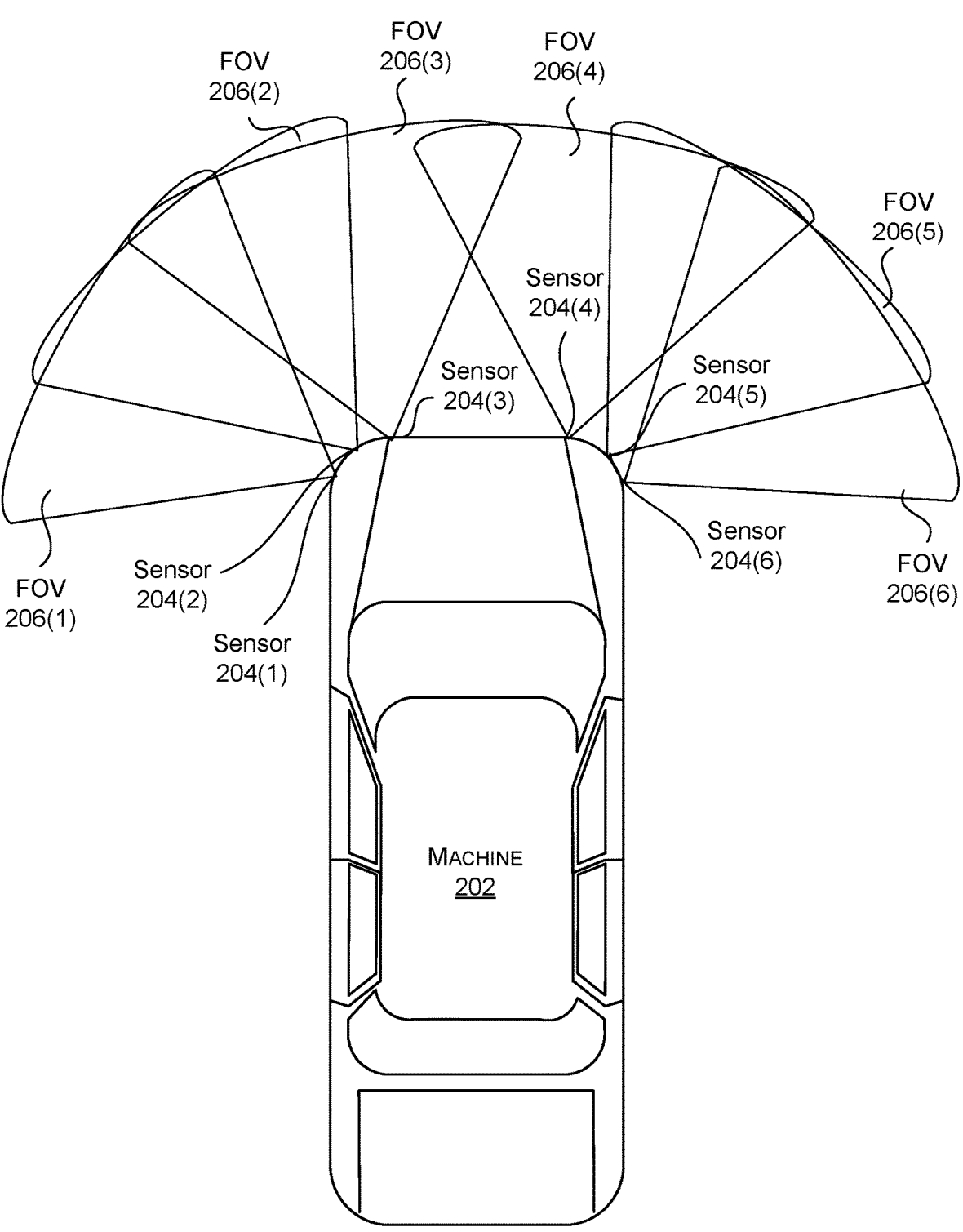
FIG. 2 illustrates an example of a machine that includes sensors, in accordance with some embodiments of the present disclosure.

For instance, FIG. 2 illustrates an example of a machine 202 that includes sensors 204(1)-(6) (also referred to singularly as "sensor 204" or in plural as "sensors 204"), in accordance with some embodiments of the present disclosure. While the example of FIG. 2 illustrates six sensors 204 located on a front of the machine 202, in other examples, the machine 202 may include any other number of sensors located at any other locations on the machine 202. Additionally, as shown, the sensors 204(1)-(6) may respectively include fields-of-view (FOVs) 206(1)-(6) (also referred to singularly as "FOV 206" or in plural as "FOVs 206"), where the FOVs 206 at least partially overlap with one another. In some examples, the sensors 204 may each include a specific type of sensor, such as ultrasonic sensors. However, in other examples, one or more of the sensors 204 may include one or more additional and/or alternative types of sensors.

As such, the machine 202 and/or the sensors 204 may be associated with configuration data (e.g., the configuration data 108) representing an order associated with processing instances of sensor data generated using the sensors 204. For a first example, the configuration data may indicate the first sensor 204(1), followed by the second sensor 204(2), followed by the third sensor 204(3), followed by the fourth sensor 204(4), followed by the fifth sensor 204(5), and finally followed by the sixth sensor 204(6). For a second example, the configuration data may indicate the sixth sensor 204(6), followed by the fifth sensor 204(5), followed by the fourth sensor 204(4), followed by the third sensor 204(3), followed by the second sensor 204(2), and finally followed by the first sensor 204(1). Still, for a third example, the configuration data may indicate starting with the first sensor 204(1) and then moving in a clockwise direction with respect to the machine 202. While these are just a few examples of orders that may be associated with the sensors 204, in other examples, the sensors 204 may be associated with one or more additional and/or alternative patterns.

Referring back to the example of FIG. 1, in some examples, the configuration parameter(s) may further indicate a threshold distance for grouping object detections. As described herein, the threshold distance may include, but is not limited to, 10 centimeters, 30 centimeters, 50 centimeters, 1 meter, and/or any other distance. In some examples, the configuration parameter(s) may further indicate a minimum number of object detections for generating a group and/or a maximum number of object detections that may be associated with a group. As described herein, the minimum number of object detections may include, but is not limited to, one object detection, two object detections, three object detections, four object detections, and/or any other number of object detections. Additionally, the maximum number of object detections may include, but is not limited to, fourth object detections, five object detections, six object detections, seven object detections, and/or any other number of object detections.

The process 100 may include the grouping component 102 processing the sensor data 104 and/or the configuration data 108 in order to group object detections into one or more groups. For instance, to start a group, the grouping component 102 may process first sensor data 104 generated using a first sensor 106, such as the starting sensor as indicated by the configuration data 108. In some examples, when starting the group, the system(s) may only process a specific type of sensor data 104, such as sensor data 104 associated with a main measurement of the first sensor 106. As described herein, the sensor data 104 may be associated with a main measurement based at least on the first sensor 106 both firing an output (e.g., an ultrasonic wave, etc.) and receiving an input (e.g., one or more echoes) associated with the output. However, in other examples, when starting the group, the grouping component 102 may process multiple types of sensor data 104, such as sensor data 104 associated with a main measurement as well as sensor data 104 associated with a secondary measurement. As described herein, the sensor data 104 may be associated with a secondary measurement based at least on another sensor 106 firing the output, but the first sensor 106 still receiving the input associated with the output.

In any of the examples, based at least on processing the first sensor data 104, the grouping component 102 may determine whether the first sensor data 104 represents a first object detection (e.g., a first echo). For example, if the first sensor data 104 includes ultrasonic data, then the grouping component 102 may determine that the first sensor data 104 represents the first object detection based at least on the first sensor data 104 representing an echo, such as when the frequency signal satisfies (e.g., is equal to or greater than) a threshold amplitude value and/or indicates a peak. If the grouping component 102 determines that the first sensor data 104 does not represent the first object detection, then the grouping component 102 may not generate a group and/or move to a next sensor 106 using the order. However, if the grouping component 102 determines that the first sensor data 104 represents the first object detection, then the grouping component 102 may generate a group associated with an object. Additionally, the grouping component 102 may associate the first object detection and/or the first sensor data 104 with the group.

The grouping component 102 may then use the order to process second sensor data 104 generated using a second sensor 106 (e.g., a neighboring sensor 106 that is in a clockwise direction with respect to the first sensor 106). In some examples, the second sensor data 104 may be associated with a main measurement or a secondary measurement. Based at least on the processing, the grouping component 102 may determine whether the second sensor data 104 represents a second object detection (e.g., a second echo) that is associated with the same object as the first object detection of the first sensor data 104. As described herein, in some examples, the grouping component 102 may determine that the second object detection is associated with the same object based at least on a distance associated with the second object detections being within the threshold distance to a distance associated with the first object detection.

If the grouping component 102 determines that the second sensor data 104 does not represent the second object detection that is associated with the same object, then the grouping component 102 may refrain from associating the second object detection and/or the second sensor data 104 with the group, and/or the grouping component 102 may terminate the process of generating the group. However, if the grouping component 102 determines that the second sensor data 104 represents the second object detection that is associated with the same object, then the grouping component 102 may associate the second object detection and/or the second sensor data 104 with the group.

The grouping component 102 may then continue, using the order, this technique of processing instances of sensor data 104 generated using one or more additional sensors 106 in order to associate one or more additional object detections and/or one or more additional instances of the sensor data 104 with the group. For instance, the grouping component 102 may continue this technique until the grouping component 102 processes an instance of sensor data 104 that does not represent an object detection that is associated with the same object, until the grouping component 102 adds the maximum number of object detections to the group, until the grouping component 102 processes a threshold number of instances of sensor data 104, until the grouping component 102 processes sensor data 104 generated by all of the sensors 106, and/or until one or more additional and/or alternative events occur.

In some examples, the grouping component 102 may then perform one or more additional and/or alternative checks on the group. For example, the grouping component 102 may determine that the group is not valid if the group is associated with a number of object detections that is less than the minimum number of object detections. Additionally, the grouping component 102 may determine that the group is valid if the group is associated with a number of object detections that is equal to or greater than the minimum number of object detections.

Figure 3A:
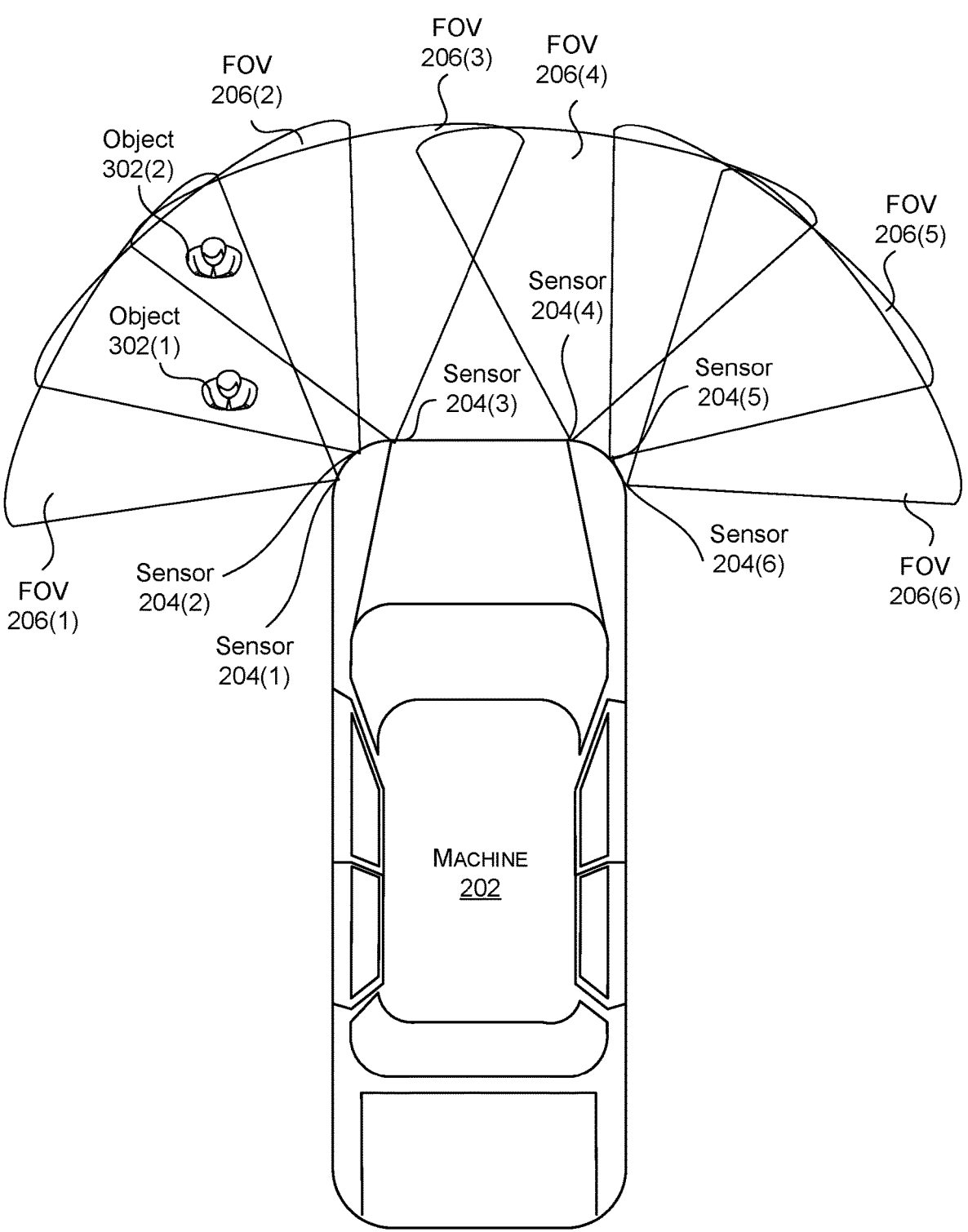
FIGS. 3A-3C illustrate an example of generating groups associated with object detections, in accordance with some embodiments of the present disclosure.
Figure 3B:
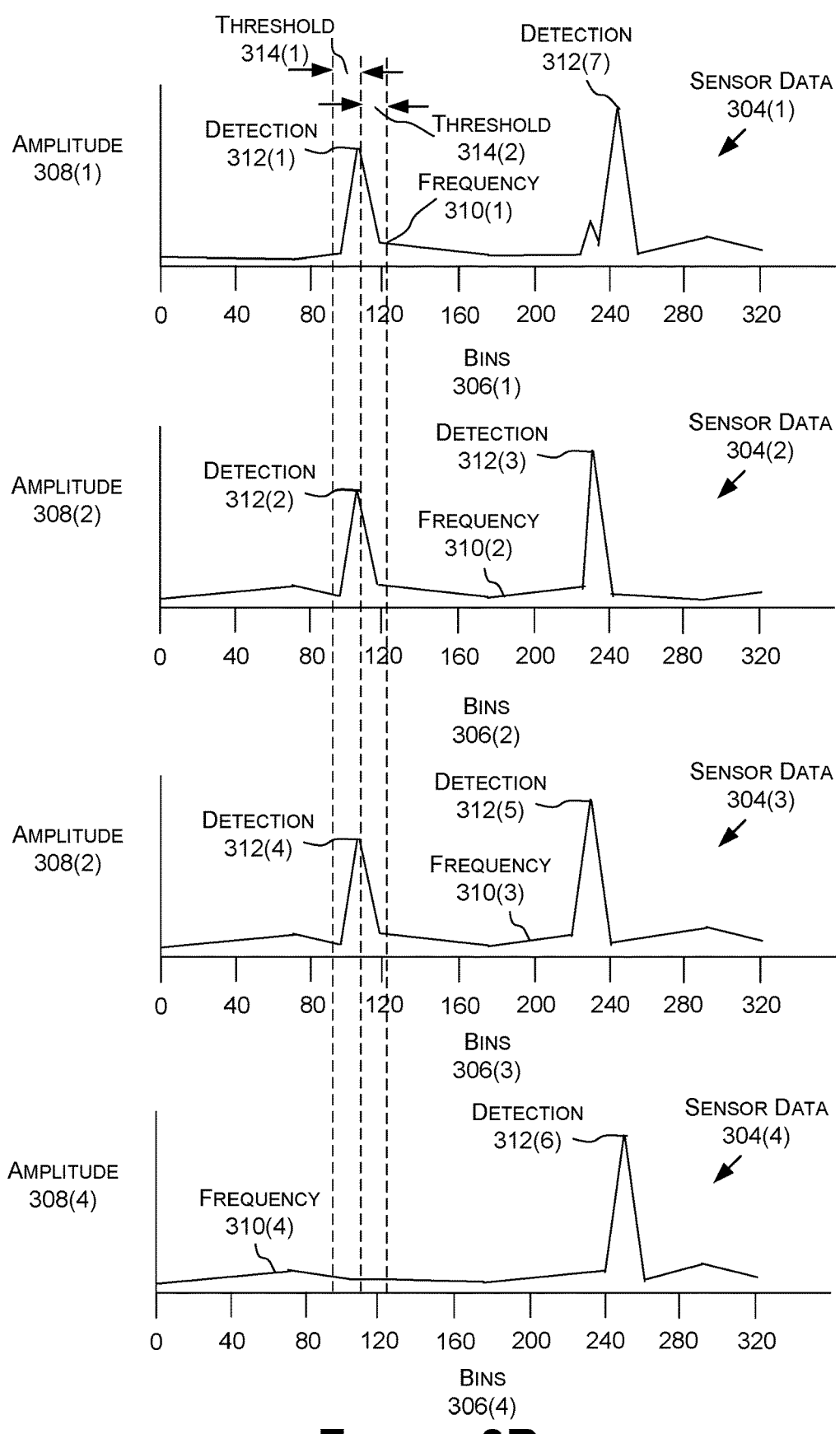
Figure 3C:
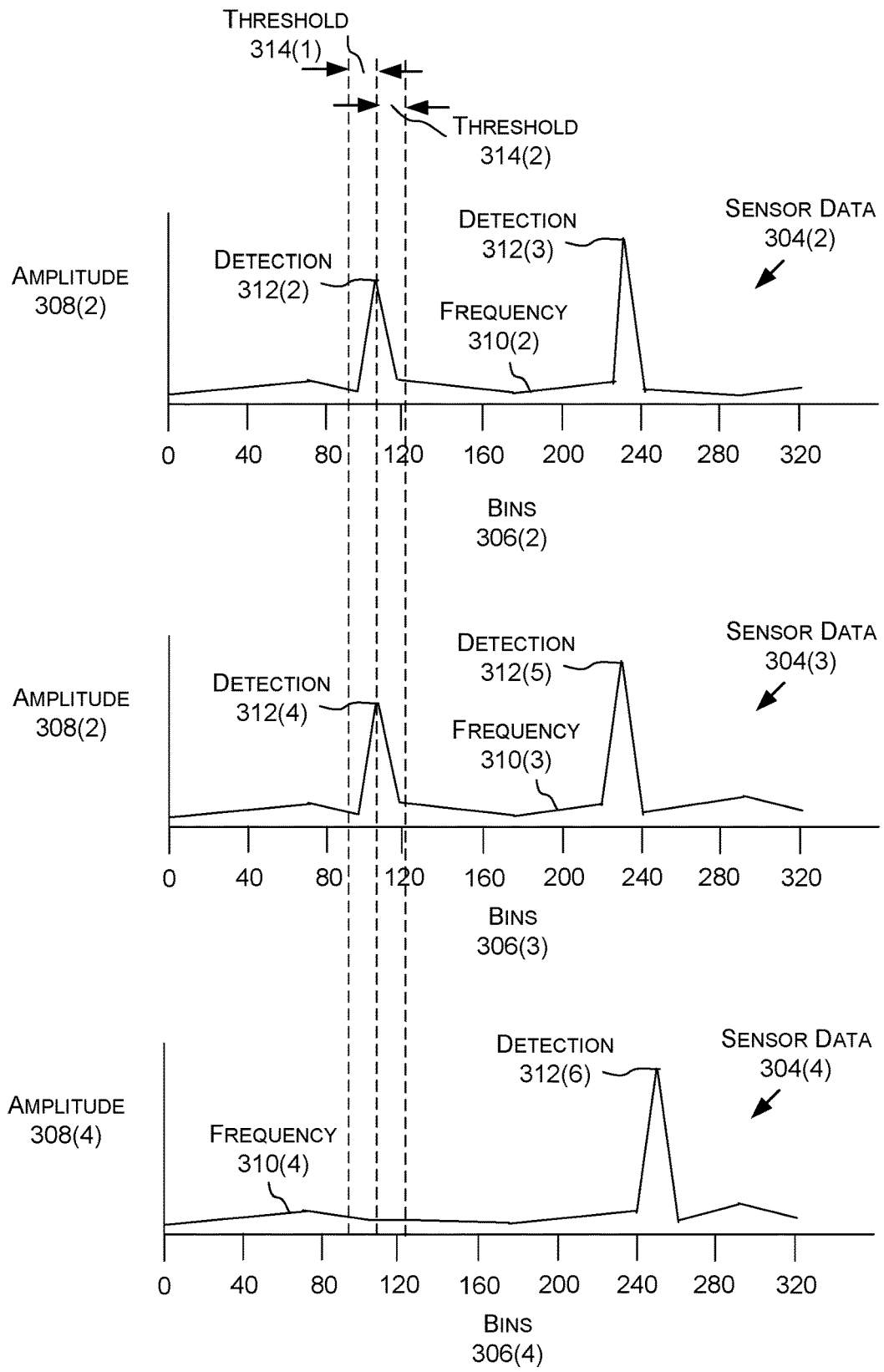

For instance, FIGS. 3A-3C illustrate an example of generating groups associated with object detections, in accordance with some embodiments of the present disclosure. As shown by the example of FIG. 3A, at least a first object 302(1) may be located within at least the first FOV 206(1) of the first sensor 204(1) and the second FOV 206(2) of the second sensor 204(2). Additionally, a second object 302(2) may be located within at least in the first FOV 206(1) of the first sensor 204(1), the second FOV 206(2) of the second sensor 204(2), and the third FOV 206(3) of the third sensor 204(3). While the example of FIG. 3A illustrates two objects 302(1)-(2) located within the environment, in other examples, any number of objects may be located within the environment. Additionally, while the example of FIG. 3A illustrates the objects 302(1)-(2) as including pedestrians, in other examples, objects may include any other type of object.

As shown by the example of FIG. 3B, the first sensor 204(1) may generate first sensor data 304(1) that is associated with a main measurement. The first sensor data 304(1) may represent a first histogram that is associated with a number of bins 306(1) and indicates amplitude values 308 (1) associated with a first frequency signal 310(1). Additionally, the second sensor 204(2) may generate second sensor data 304(2) that is associated with a secondary measurement (e.g., the first sensor 204(1) may have fired the output). The second sensor data 304(2) may represent a second histogram that is associated with a number of bins 306(2) and indicates amplitude values 308(2) associated with a second frequency signal 310(2). Furthermore, the second sensor 204(2) may also generate third sensor data 304(3) that is associated with a main measurement. The third sensor data 304(3) may represent a third histogram that is associated with a number of bins 306(3) and indicates amplitude values 308(3) associated with a third frequency signal 310(3). Moreover, the third sensor 204(3) may generate fourth sensor data 304(4) that is associated with a main measurement. The fourth sensor data 304(4) may represent a fourth histogram that is associated with a number of bins 306(4) and indicates amplitude values 308(4) associated with a fourth frequency signal 310(4).

As such, the grouping component 102 may process the first sensor data 304(1) and, based at least on the processing, determine that the first sensor data 304(1) represents a first object detection 312(1) at a peak associated with the first frequency signal 310(1). For instance, the first object detection 312(1) may be associated with the first object 302(1). Based at least on the first object detection 312(1), the grouping component 102 may generate a first group and associate the first sensor data 304(1) and/or the first object detection 312(1) with the first group.

Based at least on an order associated with the sensors 204, the grouping component 102 may then process the second sensor data 304(2) and, based at least on the processing, determine that the second sensor data 304(2) represents a second object detection 312(2) at a peak associated with the second frequency signal 310(2) and a third object detection 312(3) at another peak associated with the second frequency signal 310(2). The grouping component 102 may then determine that the second object detection 312(2) is within a threshold distance 314(1)-(2) of the first object detection 312(1). Based at least on that determination, the grouping component 102 may associate the second sensor data 304(2)

and/or the second object detection 312(2) with the first group. In some examples, the grouping component 102 may also determine that the third object detection 312(3) is outside of the threshold distance 314(1)-(2) of the first object detection 312(1). Based at least on that determination, the grouping component 102 may not associate the third object detection 312(3) with the first group.

Next, and based at least on the order, the grouping component 102 may process the third sensor data 304(3) and, based at least on the processing, determine that the third sensor data 304(3) represents a fourth object detection 312(4) at a peak associated with the third frequency signal 310(3) and a fifth object detection 312(5) at another peak associated with the third frequency signal 310(3). The grouping component 102 may then determine that the fourth object detection 312(4) is within the threshold distance 314(1)-(2) of the first object detection 312(1). Based at least on that determination, the grouping component 102 may associate the third sensor data 304(3) and/or the fourth object detection 312(4) with the first group. In some examples, the grouping component 102 may also determine that the fifth object detection 312(5) is outside of the threshold distance 314(1)-(2) of the first object detection 312(1). Based at least on that determination, the grouping component 102 may not associate the fifth object detection 312(5) with the first group.

Next, and based at least on the order, the grouping component 102 may process the fourth sensor data 304(4) and, based at least on the processing, determine that the fourth sensor data 304(4) represents a sixth object detection 312(6) at a peak associated with the fourth frequency signal 310(4). The grouping component 102 may then determine that the sixth object detection 312(6) is outside of the threshold distance 314(1)-(2) of the first object detection 312(1). Based at least on that determination, the grouping component 102 may not associate the fourth sensor data 304(4) and/or the sixth sensor detection 312(6) with the first group, and/or the grouping component 102 may determine that the first group is complete.

As described herein, the grouping component 102 may further process the first sensor data 304(1) and, based at least on the processing, determine that the first sensor data 304(1) represents a seventh object detection 312(7) at another peak associated with the first frequency signal 310(1). For instance, the seventh object detection 312(7) may be associated with the second object 302(2). Based at least on the seventh object detection 312(7), the grouping component 102 may generate a second group and associate the first sensor data 304(1) and/or the seventh object detection 312(7) with the second group. Additionally, the grouping component 102 may perform similar processes, as those described herein with respect to the first group, to associate the second sensor data 304(2) with the second group, the third object detection 312(3) with the second group, the third sensor data 304(3) with the second group, the fifth object detection 312(5) with the second group, the fourth sensor data 304(4) with the second group, and/or the sixth object detection 312(6) with the second group.

In some examples, after processing all of the sensor detections for the first sensor data 304(1), and based at least on the order, the grouping component 102 may move to processing the second senor data 304(2) in order to determine whether to generate one or more new groups. For instance, and as illustrated by the example of FIG. 3C, the grouping component 102 may process the second sensor data 304(2) and, based at least on the processing, determine that the second sensor data 304(2) represents the second object detection 312(2) at a peak associated with the second frequency signal 310(2). For instance, the second object detection 312(2) may be associated with the first object 302(1). Based at least on the second object detection 312(2), the grouping component 102 may generate a third group and associate the second sensor data 304(2) and/or the second object detection 312(2) with the third group.

Next, and based at least on the order, the grouping component 102 may process the third sensor data 304(3) and, based at least on the processing, determine that the third sensor data 304(3) represents the fourth object detection 312(4) at a peak associated with the third frequency signal 310(3) and the fifth object detection 312(5) at another peak associated with the third frequency signal 310(3). The grouping component 102 may then determine that the fourth object detection 312(4) is within the threshold distance 314(1)-(2) of the second object detection 312(2). Based at least on that determination, the grouping component 102 may associate the third sensor data 304(3) and/or the fourth object detection 312(4) with the third group. In some examples, the grouping component 102 may also determine that the fifth object detection 312(5) is outside of the threshold distance 314(1)-(2) of the second object detection 312(2). Based at least on that determination, the grouping component 102 may not associate the fifth object detection 312(5) with the second group.

Next, and based at least on the order, the grouping component 102 may process the fourth sensor data 304(4) and, based at least on the processing, determine that the fourth sensor data 304(4) represents the sixth object detection 312(6) at a peak associated with the fourth frequency signal 310(4). The grouping component 102 may then determine that the sixth object detection 312(6) is outside of the threshold distance 314(1)-(2) of the second object detection 312(2). Based at least on that determination, the grouping component 102 may not associate the fourth sensor data 304(4) and/or the sixth sensor detection 312(6) with the third group, and/or the grouping component 102 may determine that the third group is complete.

In some examples, the grouping component 102 may then determine that the third group is not valid based at least on the third group only being associated with two instances of sensor data 304(2)-(3) and/or two object detections 312(2) and 312(4). For instance, in these examples, the minimum number of object detections for verifying a group may include three object detections. However, in other examples, the grouping component 102 may still determine that the third group is valid based at least on the third group being associated with two instances of sensor data 304(2)-(3) and/or two object detections 312(2) and 312(4). For instance, in these examples, the minimum number of object detections for verifying a group may include two object detections.

As described herein, the grouping component 102 may further process the second sensor data 304(2) and, based at least on the processing, determine that the second sensor data 304(2) represents the third object detection 312(3) at another peak associated with the second frequency signal 310(2). For instance, the third object detection 312(3) may be associated with the second object 302(2). Based at least on the third object detection 312(3), the grouping component 102 may generate a fourth group and associate the second sensor data 304(2) and/or the third object detection 312(3) with the fourth group. Additionally, the grouping component 102 may perform similar processes, as those described herein with respect to the first group, to associate the third sensor data 304(3) with the fourth group, the fifth object detection 312(5) with the fourth group, the fourth sensor data 304(4) with the fourth group, and/or the sixth object detection 312(6) with the fourth group.

In some examples, the grouping component 102 may then move on to processing the third sensor data 304(3) associated with the third sensor 204(3) in order to determine whether to generate one or more new groups and/or the fourth sensor data 304(4) associated with the fourth sensor 204(4) in order to determine whether to generate one or more new groups. As described herein, the grouping component 102 may use the order associated with the sensors 204 when determining which sensors 204 to process and/or the cycle for processing the sensors 204.

Referring back to the example of FIG. 1, the process 100 may include the grouping component 102 generating and/or outputting grouping data 110 representing the groups. As descried herein, and for a group, the grouping data 110 may represent at least an identifier associated with the group, identifiers for instances of sensor data 104 associated with the group, identifiers for object detections associated with the group, and/or any other information associated with the group. The process 100 may then include a processing component 112 processing at least a portion of the sensor data 104 along with at least a portion of the grouping data 110 in order to perform one or more tasks.

For example, the processing component 112 may include and/or use one or more machine learning models, one or more neural networks, one or more algorithms, one or more modules, and/or any other type of processing component that is configured to process the sensor data 104 in order to perform the task(s). As described herein, in some examples, a task may include, but is not limited to, object detection, object tracking, object classification, map (and/or any other type of representation) generation, and/or any other task. Additionally, the processing component 112 may use the grouping data 110 such that the processing component 112 is able to process the different combinations of object detections that are associated with respective groups. For example, the processing component 112 may process first object detections associated with a first group to generate first output data 114 representing first information associated with a first object, process second object detections associated with a second group to generate second output data 114 representing second information associated with a second group, process third object detections associated with a third group to generate third output data 114 representing third information associated with a third object, and/or so forth.

Figure 4:
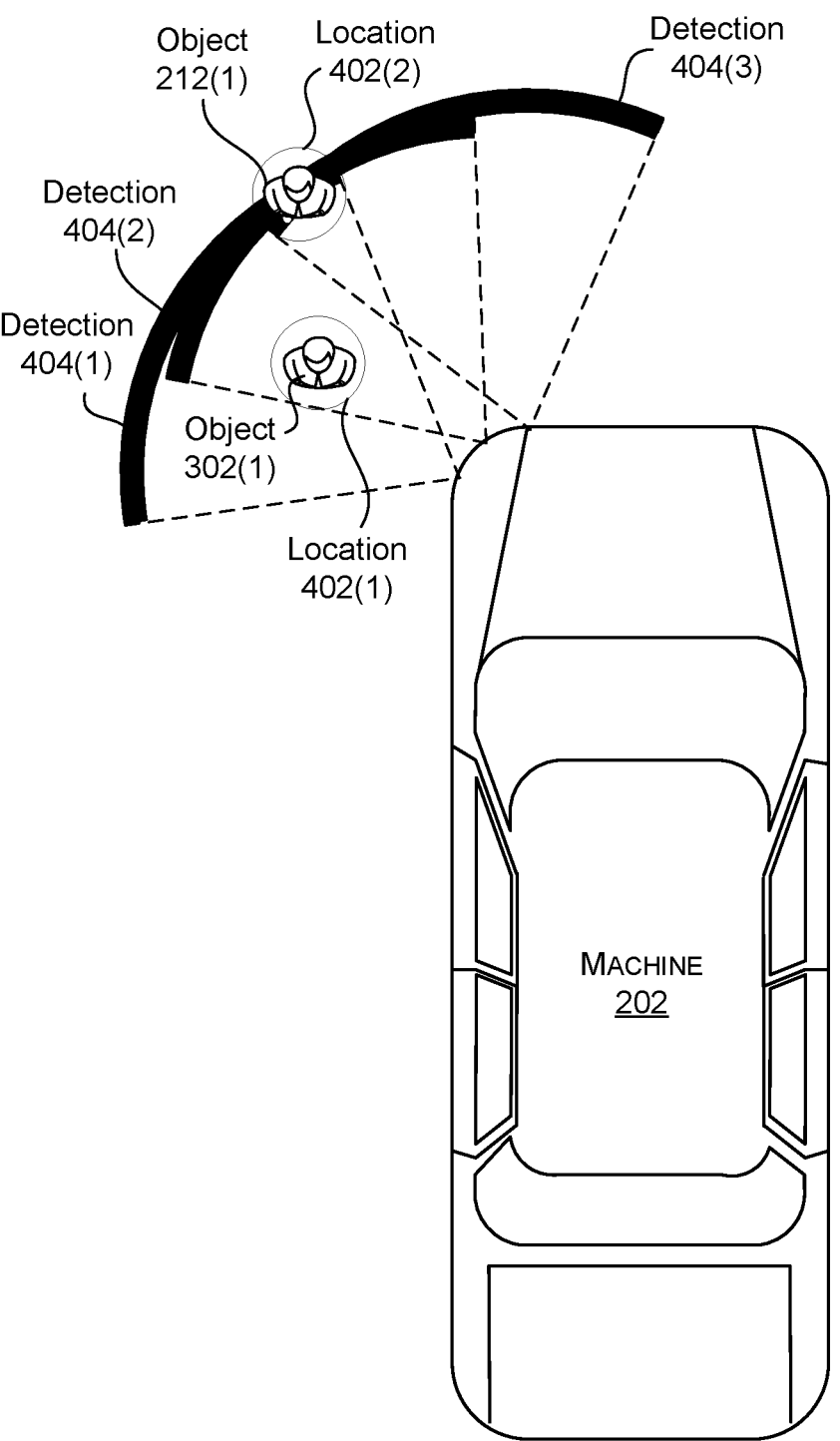
FIG. 4 illustrates an example of processing object detections associated with groups in order to determine information associated with objects, in accordance with some embodiments of the present disclosure.

For instance, FIG. 4 illustrates an example of processing object detections associated with groups in order to determine information associated with objects, in accordance with some embodiments of the present disclosure. In the example of FIG. 4, the processing component 112 may use grouping data to identify the first group that is associated with at least the first sensor data 304(1), the first object detection 312(1), the second sensor data 304(2), the second object detection 312(2), the third sensor data 304(3), and/or the fourth object detection 312(4). The processing component 112 may then process the first sensor data 304(1), the first object detection 312(1), the second sensor data 304(2), the second object detection 312(2), the third sensor data 304(3), and/or the fourth object detection 312(4) using one or more techniques, such as one or more trilateration algorithms, in order to determine a first location 402(1) associated with the first object 302(1).

Additionally, the processing component 112 may use grouping data to identify the fourth group that includes at least the second sensor data 304(2), the third object detection 312(3), the third sensor data 304(3), the fifth object detection 312(5), the fourth sensor data 304(4), and/or the sixth object detection 312(6). The processing component 112 may then process the second sensor data 304(2), the third object detection 312(3), the third sensor data 304(3), the fifth object detection 312(5), the fourth sensor data 304(4), and/or the sixth object detection 312(6) using one or more techniques, such as one or more trilateration algorithms, in order to determine a second location 402(2) associated with the second object 302(2).

For more details about processing the fourth group, the processing component 112 may use the third object detection 312(3), as represented by detection 404(1), the fifth object detection 312(5), as represented by detection 404(2), and the sixth object detection 312(6), as represented by detection 404(3). The processing component 112 may then process the detections 404(1)-(3), such as by using one or more trilateration algorithms (and/or any other type of algorithm), to determine the second location 402(2) associated with the second object 302(2). While these are just a few example techniques of how the processing component 112 may process the sensor data 304(1)-(4) and/or the object detections 312(1)-(7) based at least on one or more groupings in order to perform a specific task, in other examples, the processing component 112 may process the sensor data 304(1)-(4) and/or the object detections 312(1)-(7) based at least on the groupings in order to perform one or more additional and/or alternative tasks.

Now referring to FIGS. 5 and 6, each block of methods 500 and 600, described herein, comprises a computing process that may be performed using any combination of hardware, firmware, and/or software. For instance, various functions may be carried out by a processor executing instructions stored in memory. The methods 500 and 600 may also be embodied as computer-usable instructions stored on computer storage media. The methods 500 and 600 may be provided by a standalone application, a service or hosted service (standalone or in combination with another hosted service), or a plug-in to another product, to name a few. In addition, the methods 500 and 600 are described, by way of example, with respect to FIG. 1. However, these methods 500 and 600 may additionally or alternatively be executed by any one system, or any combination of systems, including, but not limited to, those described herein.

FIG. 5 illustrates a flow diagram showing a method 500 for grouping object detections associated with ultrasonic data and then using the grouping to perform one or more tasks, in accordance with some embodiments of the present disclosure. The method 500, at block B502, may include obtaining first sensor data generated using a first ultrasonic sensor of a machine and second sensor data generated using a second ultrasonic sensor of the machine. For instance, the grouping component 102 may receive the first sensor data 104 generated using the first sensor 106 and the second sensor data 104 generated using the second sensor 106, where the first sensor 106 and the second sensor 106 may include ultrasonic sensors. In some examples, the grouping component 102 may further receive the configuration data 108 representing the configuration parameter(s) for grouping at least the first sensor data 104 and the second sensor data 104.

The method 500, at block B504, may include determining, based at least on the first sensor data indicating a first object detection associated with a first distance from the machine, to associate the first sensor data with a group corresponding to an object. For instance, the grouping component 102 may process the first sensor data 104 in order to determine that the first sensor data 104 indicates the first object detection. As described herein, in some examples, the first sensor data 104 may represent at least first frequency signal, where a peak associated with the first frequency signal indicates the first object detection (e.g., a first echo) at the first distance. Based at least on that determination, the grouping component 102 may create the group corresponding to the object and then associate the first sensor data 104 and/or the first object detection with the group.

The method 500, at block B506, may include determining that the second sensor data indicates a second object detection associated with a second distance from the machine. For instance, the grouping component 102 may process the second sensor data 104 in order to determine that the second sensor data 104 indicates the second object detection. As described herein, in some examples, the second sensor data 104 may represent at least a second frequency signal, where a peak associated with the second frequency signal indicates the second object detection (e.g., a second echo) at the second distance. Additionally, in some examples, the grouping component 102 may use the configuration data 108 to determine to process the second sensor data 104 after processing the first sensor data 104.

The method 500, at block B508, may include determining, based at least on the second distance being within a threshold distance to the first distance, to associate the second object detection with the group. For instance, the grouping component 102 may determine that the second distance is within the threshold distance to the first distance, where the threshold distance may be represented by the configuration data 108. Based at least on determining that the second distance is within the threshold distance to the first distance, the grouping component 102 may associated the second sensor data 104 and/or the second object detection with the group. Additionally, the grouping component 102 may perform similar processes to associate one or more additional instance of sensor data 104 and/or one or more additional object detections with the group.

The method 500, at block B510, may include determining, based at least on the group and using at least the first object detection and the second object detection, a location associated with the object. For instance, the processing component 112 may determine to process the sensor data 104 and/or the object detections associated with the group in order to determine information associated with the object, such as the location associated with the object. In some examples, the processing component 112 may process the sensor data 104 and/or the object detections using a machine learning model(s), a neural network(s), an algorithm(s), module(s), and/or any other component that is configured to determine the information. For example, the processing component 112 may determine the location by processing the sensor data 104 and/or the object detections using one or more trilateration algorithms.

The method 500, at block B512, may include causing, based at least on the location associated with the object, the machine to perform one or more operations. For instance, the machine may determine the operation(s) based at least on the location associated with the object. As described herein, in some examples, the operation(s) may include causing the machine to navigate one or more trajectories within the environment, such as to avoid a collision with the object.

FIG. 6 illustrates a flow diagram showing a method 600 for grouping object detections that are detected using multiple sensors, in accordance with some embodiments of the present disclosure. The method 600, at block B602, may include obtaining sensor data generated using sensors of a machine. For instance, the grouping component 102 may receive the sensor data 104 generated using the sensors 106 of the machine. As described herein, in some examples, the sensor data 104 may include 1D representations generated using specific types of sensors, such as ultrasonic sensors, sonar sensors, and/or the like. However, in other examples, the sensor data 104 may be generated using any other type of sensors, such as image sensors, LiDAR sensors, RADAR sensors, and/or the like.

The method 600, at block B604, may include determining that a portion of the sensor data, which is associated with a sensor, indicates an object detection corresponding to an object. For instance, the grouping component 102 may process the sensor data 104 and, based at least on the processing, determine that the portion of the sensor data 104 represents the object detection. For example, if the sensor data 104 includes ultrasonic data, then the grouping component 102 may determine that the ultrasonic data represents an echo associated with an object located within the environment.

The method 600, at block B606, may include associating at least one of the portion of the sensor data or the object detection with a group corresponding to the object. For instance, based at least on the object detection, the grouping component 102 may generate the group corresponding to the object. The grouping component 102 may then associate at least one of the portion of the sensor data 104 or the object detection with the group.

The method 600, at block B608, may include determining that an additional portion of the sensor data, which is associated with an additional sensor, indicates an additional object detection. For instance, the grouping component 102 may identify the additional sensor 106 using one or more techniques, such as the configuration data 108 indicating an order associated with processing the sensor data 104 generated using the sensors 106. For example, the configuration data 108 may indicate to process the additional portion of the sensor data 104 generated using the additional sensor 106 after processing the portion of the sensor data 104 generated using the sensor 106. Based at least on the processing, the grouping component 102 may determine that the additional portion of the sensor data 104 represents the additional object detection. For example, if the sensor data 104 again includes ultrasonic data, then the grouping component 102 may determine that the ultrasonic data represents an additional echo associated with the object and/or another object located within the environment.

The method 600, at block B610, may include determining whether the additional object detection is associated with the object. For instance, the grouping component 102 may determine whether the additional object detection is also associated with the object. As described herein, in some examples, the grouping component 102 may determine that the additional object detection is also associated with the object based at least on a distance associated with the additional object detection being within a threshold distance to a distance associated with the object detection. Alternatively, in some examples, the grouping component 102 may determine that the additional object detection is not associated with the object based at least on the distance associated with the additional object detection being outside of the threshold distance to the distance associated with the object detection.

If, at block B610, it is determined that the additional object detection is associated with the object, then the method 600, at block B612, may include associating at least one of the additional portion of the sensor data or the additional object detection with the group. For instance, if the grouping component 102 determines that the additional object detection is also associated with the object, then the grouping component 102 may associate at least one of the additional portion of the sensor data 104 or the additional object detection with the group. Additionally, as further shown by the example of FIG. 6, the method 600 may repeat starting at block B608 in order to associate one or more additional portions of the sensor data 104 and/or one or more additional object detections with the group.

However, if, at block B610, it is determined that the additional object detection is not associated with the object, then the method 600, at block B614, may include performing one or more operations using the group. For instance, in some examples, based at least on determining that the additional object detection is not associated with the object, the grouping component 102 may determine that the group is complete. The processing component 112 may then use the grouping data 110 associated with the group and the sensor data 104 to perform the operation(s). For example, the processing component 112 may use the grouping data 110 and the sensor data 104 to determine a location associated with the object within the environment, generate a map (and/or other type of representation) representing information associated with the environment, determine a trajectory for the machine to navigate within the environment, and/or perform any other operation.

Example Autonomous Vehicle

Figure 7A:
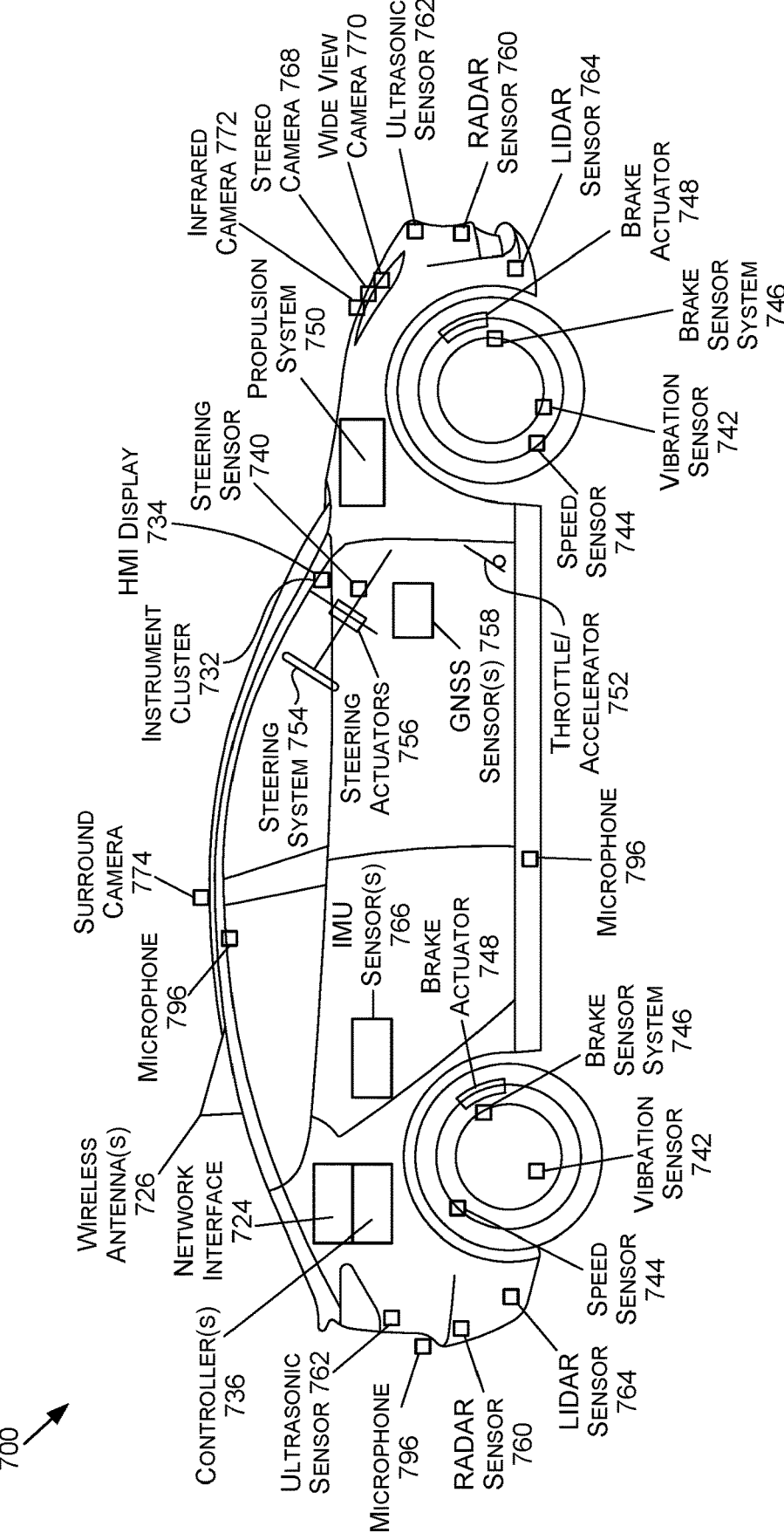
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
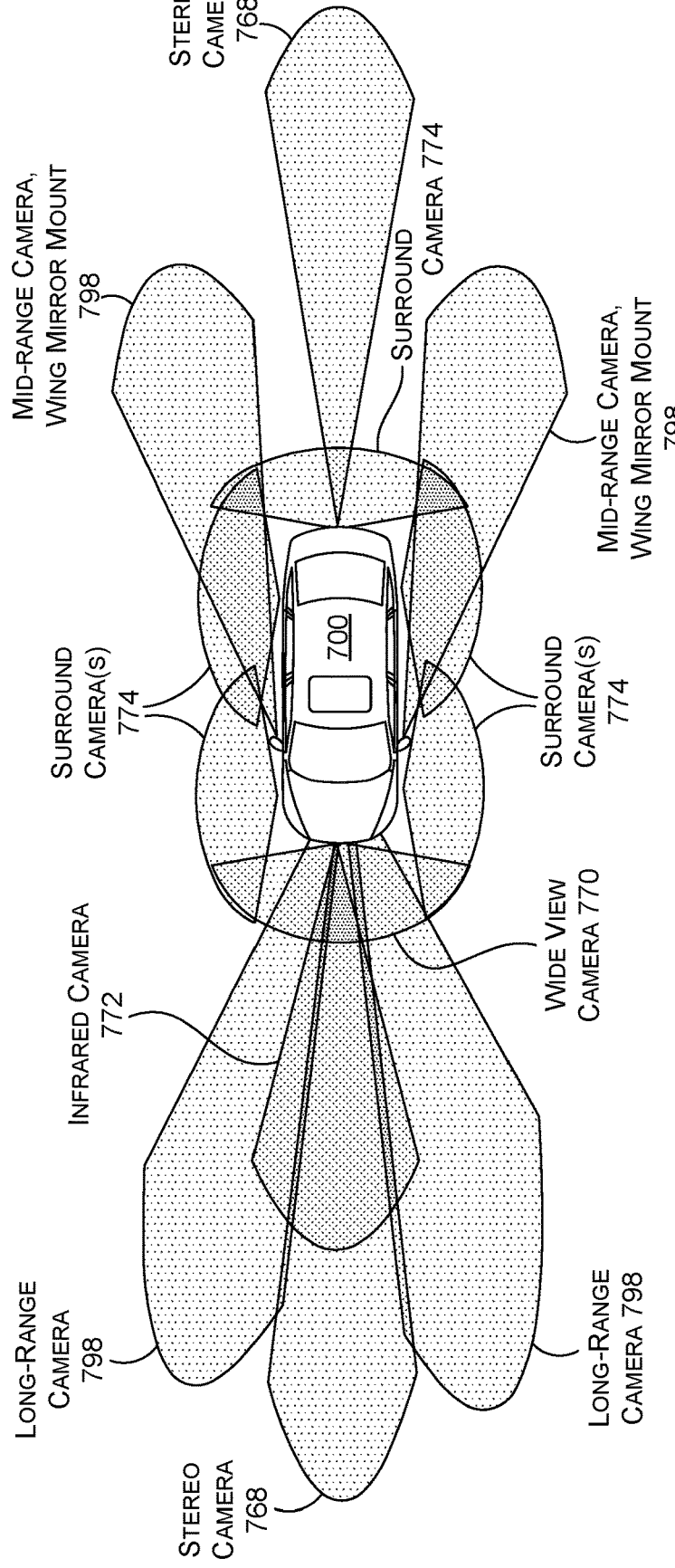
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
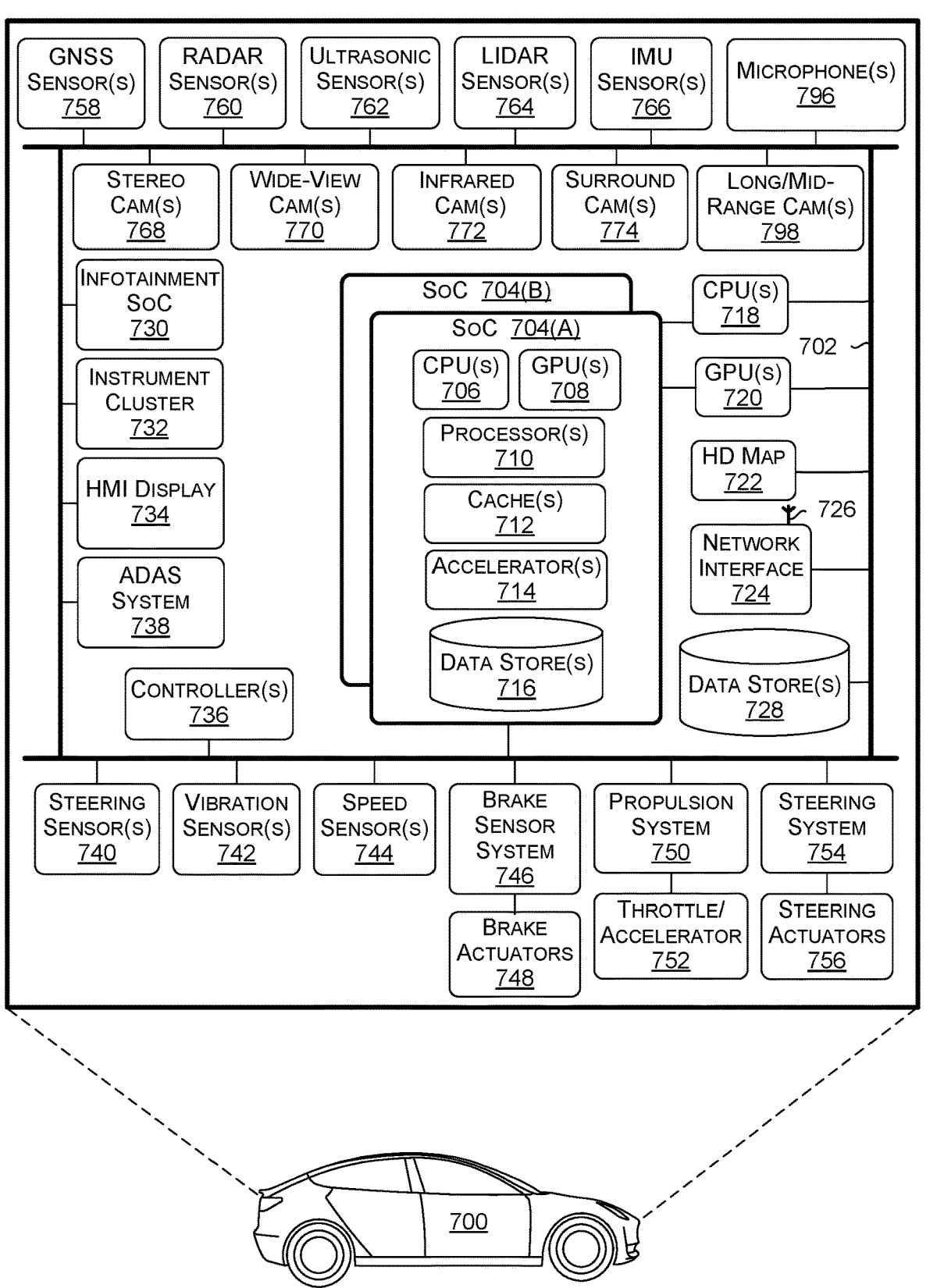
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))— or other math coprocessor or numeric coprocessor types—for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's info-tainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass stor-age controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly.

However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
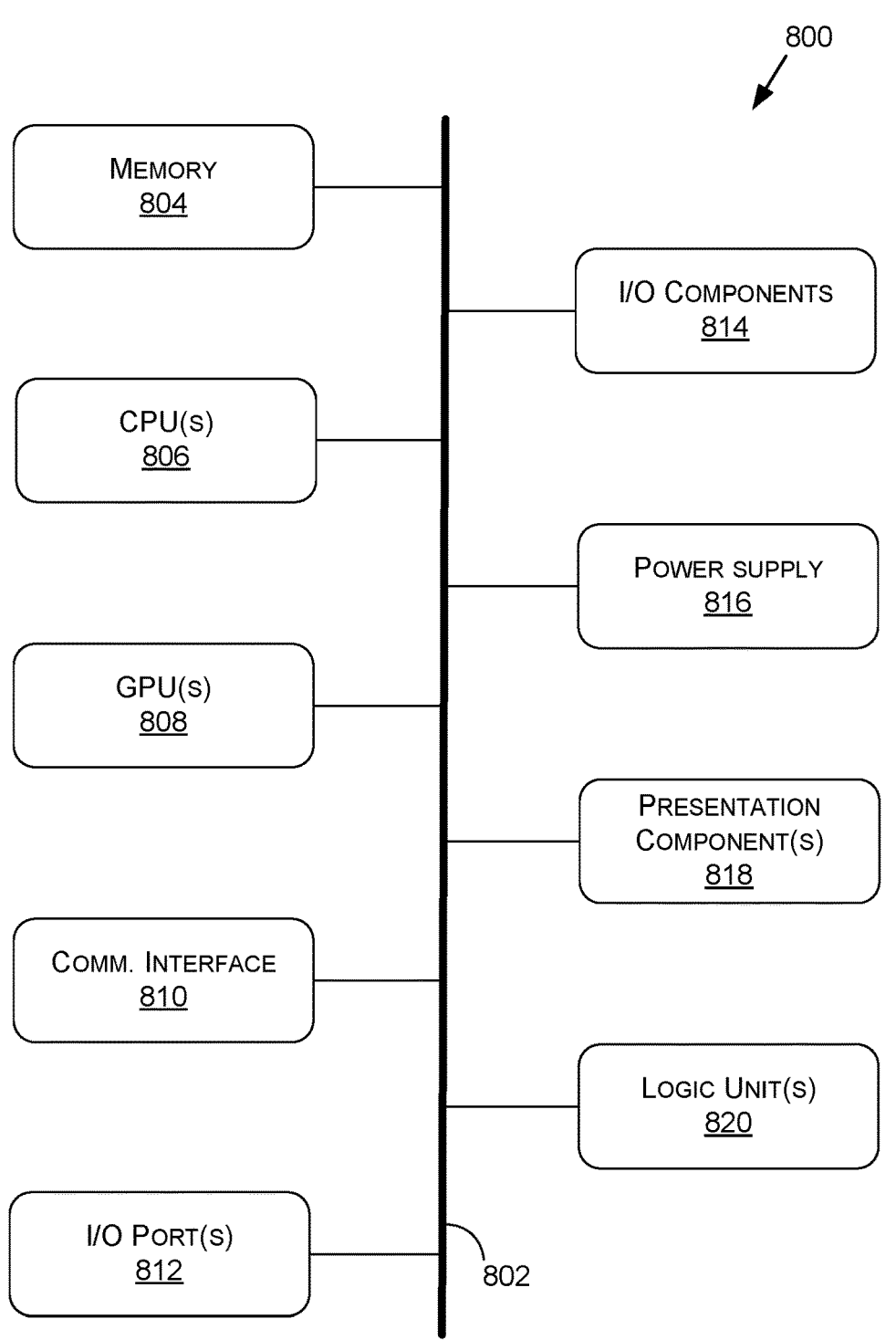
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device,"

"game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per sc.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Trec Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
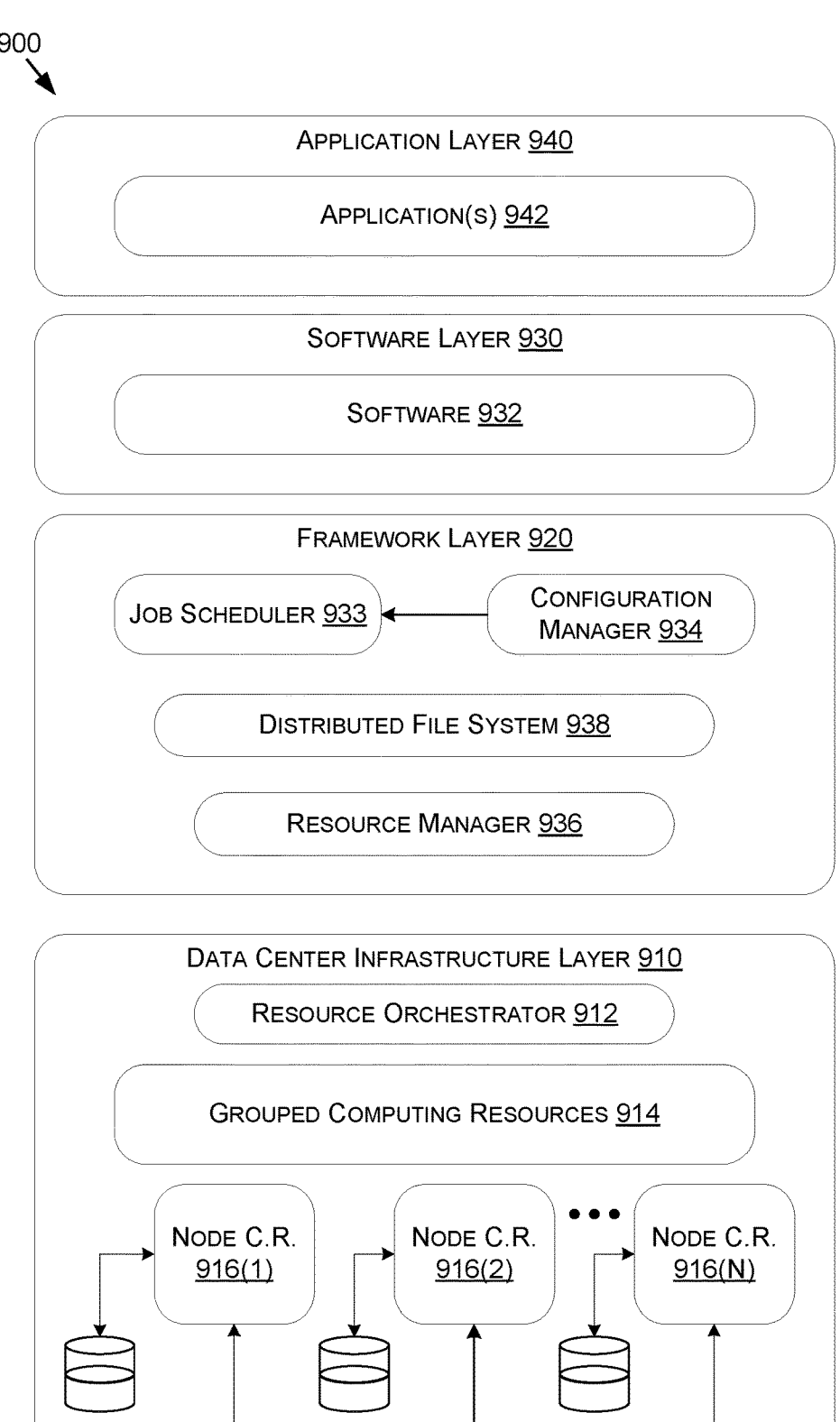
FIG. 9 is a block diagram of an example data center suitable for use in implementing some embodiments of the present disclosure.

FIG. 9 illustrates an example data center 900 that may be used in at least one embodiments of the present disclosure.

The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic readonly memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

A: A method comprising: obtaining first sensor data generated using a first ultrasonic sensor of a machine and second sensor data generated using a second ultrasonic sensor of the machine; determining, based at least on the first sensor data indicating a first object detection associated with a first distance from the machine, to associate the first object detection with a group corresponding to an object; determining that the second sensor data indicates a second object detection associated with a second distance from the machine; determining, based at least on the second distance being within a threshold distance to the first distance, to associate the second object detection with the group; determining, based at least on the group and using at least the first object detection and the second object detection, a location associated with the object; and causing the machine to perform one or more operations based at least on the location associated with the object.

B: The method of paragraph A, further comprising: determining, based at least on one or more configurations associated with at least the first ultrasonic sensor and the second ultrasonic sensor, an order that includes analyzing the second sensor data after the first sensor data, wherein the determining that the second sensor data indicates the second object detection is based at least on the order.

C: The method of paragraph A or paragraph B, further comprising: obtaining third sensor data generated using a third ultrasonic sensor of the machine; determining that the third sensor data indicates a third object detection associated with a third distance from the machine; and refraining, based at least on the third distance being outside of the threshold distance to the first distance, from associating the third object detection with the group.

D: The method of any one of paragraphs A-C, wherein the first sensor data includes a first primary measurement and the second sensor data includes a second primary measurement, and wherein the method further comprises: obtaining third sensor data generated using at least one of the first ultrasonic sensor or the second ultrasonic sensor, the third sensor data including a secondary measurement; determining that the third sensor data indicates a third object detection associated with a third distance from the machine; and determining, based at least on the third distance being within the threshold distance to the first distance, to associate the third object detection with the group, wherein the determining the location associated with the object further uses the third object detection.

E: The method of any one of paragraphs A-D, further comprising: determining, based at least on the first sensor data indicating a third object detection associated with a third distance from the machine, to associate the third object detection with a second group corresponding to a second object; determining that the second sensor data indicates a fourth object detection associated with a fourth distance from the machine; determining, based at least on the fourth distance being within the threshold distance to the third distance, to associate the fourth object detection with the second group; and determining, based at least on the second group and using at least the third object detection and the fourth object detection, a second location associated with the second object, wherein the causing the machine to perform one or more operations is further based at least on the second location associated with the second object.

F: The method of any one of paragraphs A-E, wherein the determining the location associated with the object comprises determining, based at least on the group and processing the first object detection and the second object detection using one or more trilateration algorithms, the location associated with the object.

G: A system comprising: one or more processors to: obtain first sensor data generated using a first sensor of a machine and second sensor data generated using a second sensor of the machine; determine that the first sensor data indicates a first object detection at a first distance; determine that the second sensor data indicates a second object detection at a second distance that is within a threshold distance to the first distance; determine, based at least on the second distance being within the threshold distance to the first distance and using the first object detection and the second object detection, a location associated with an object; and cause performance of one or more operations based at least on the location associated with the object.

H: The system of paragraph G, wherein the one or more processors are further to: generate, based at least on the first sensor data indicating the first object detection, a group corresponding to the object; associate at least one of the first sensor data or the first object detection with the group, and associate, based at least on the second distance being within the threshold distance to the first distance, at least one of the second sensor data or the second object detection with the group, wherein the determination of the location associated with the object is based at least on the group.

I: The system of paragraph G or paragraph H, wherein the one or more processors are further to: determine that the second sensor includes a next sensor to analyze after the first sensor, wherein the determination that the second sensor data indicates the second object detection at the second distance that is within the threshold distance to the first distance is based at least on the second sensor including the next sensor to analyze after the first sensor.

J: The system of paragraph I, wherein the determination that the second sensor includes the next sensor to analyze after the first sensor is based at least on one or more of: an order associated with sensors of the machine, the order indicating that the second sensor includes the next sensor to analyze after the first sensor; or the second sensor including a neighboring sensor to the first sensor.

K: The system of any one of paragraphs G-J, wherein the one or more processors are further to: obtain third sensor data generated using a third sensor of the machine; determine that the third sensor data indicates a third object detection at a third distance that is outside of the threshold distance to the first distance; and based at least on the third distance being outside of the threshold distance to the first distance, refrain from using the third object detection for the determination of the location associated with the object.

L: The system of any one of paragraphs G-K, wherein the first sensor data includes a first main measurement and the second sensor data includes a second main measurement, and wherein the one or more processors are further to: obtain third sensor data generated using at least one of the first sensor or the second sensor, the third sensor data including a secondary measurement; and determine that the third sensor data indicates a third object detection at a third distance that is within the threshold distance to the first distance, wherein the determination of the location associated with the object further uses the third object detection based at least on the third distance being within the threshold distance to the first distance.

M: The system of any one of paragraphs G-L, wherein the one or more processors are further to: obtain third sensor data generated using a third sensor of the machine; and determine that the third sensor data indicates a third object detection at a third distance that is within the threshold distance to the first distance, wherein the determination of the location associated with the object further uses the third object detection based at least on the third distance being within the threshold distance to the first distance.

N: The system of any one of paragraphs G-M, wherein the one or more processors are further to: obtain third sensor data generated using a third sensor of the machine; determine that the second sensor data indicates a third object detection at a third distance; determine that the third sensor data indicates a fourth object detection at a fourth distance that is within the threshold distance to the third distance; and determine, based at least on the fourth distance being within the threshold distance to the third distance and using the third object detection and the fourth object detection, a second location associated with a second object, wherein the performance of one or more operations is further caused based at least on the second location associated with the second object.

O: The system of any one of paragraphs G-N, wherein the one or more processors are further to: associate, based at least on the second distance being within the threshold distance to the first distance, at least the first object detection and the second object detection with a group corresponding to the object; and determine that the group includes at least one of more than a first threshold number of object detections or less than a second threshold number of object detections, wherein the determination of the location associated with the object is based at least on the group including at least one of more than the first threshold number of object detections or less than the second threshold number of object detections.

P: The system of any one of paragraphs G-O, wherein the determination of the location associated with the object comprises determining, based at least on the second distance being within the threshold distance to the first distance and processing the first object detection and the second object detection using one or more trilateration algorithms, the location associated with the object.

Q: The system of any one of paragraphs G-P, wherein the performance of the one or more operations comprises at last one of: generating a map indicating at least the location associated with the object; or causing the machine to navigate based at least on the location associated with the object.

R: The system of any one of paragraphs G-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more visual language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S: One or more processors comprising: processing circuitry to cause performance of one or more operations of a machine based at least on a location associated with an object, wherein the location associated with the object is determined based at least on associating a first object detection determined using a first ultrasonic sensor of the machine with a second object detection determined using a second ultrasonic sensor of the machine, the associating being based at least on at least one of a first location of the first ultrasonic sensor with respect to a second location of the second ultrasonic sensor or a first distance associated with the first object detection with respect to a second distance associated with the second object detection.

T: The one or more processors of paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more visual language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

Any, some and/or all features in one aspect of the disclosure may be applied to other aspects of the disclosure, in any appropriate combination or sub-combination. In particular, device aspects may be applied to method aspects, and vice versa. It should also be appreciated that particular combinations of the various features described and defined in any aspect or embodiment of the disclosure can be implemented and/or supplied and/or used independently.

The various features described in the description as optional—such as by use of "may" or "can"—may be combined into a single embodiment, and/or any combination of the features may be combined to form various embodiments that rely on the combination of these various optional features.

What is claimed is:

1. A method comprising:
obtaining first sensor data obtained using a first ultrasonic sensor of a machine and second sensor data obtained using a second ultrasonic sensor of the machine;
determining, based at least on the first sensor data indicating a first object detection associated with a first distance from the machine, to associate the first object detection with a group corresponding to an object;
determining that the second sensor data indicates a second object detection associated with a second distance from the machine;
determining, based at least on the second distance being within a threshold distance to the first distance, to associate the second object detection with the group;
determining, based at least on the group and using at least the first object detection and the second object detection, a location associated with the object; and
causing the machine to perform one or more operations based at least on the location associated with the object.

2. The method of claim 1, further comprising:
determining, based at least on one or more configurations associated with at least the first ultrasonic sensor and the second ultrasonic sensor, an order that includes the first ultrasonic sensor, followed by the second ultrasonic sensor; and
determining, based at least on the order, that the first sensor data indicates the first object detection associated with the first distance from the machine, wherein the determining that the second sensor data indicates the second object detection is also based at least on the order.

3. The method of claim 1, further comprising:

obtaining third sensor data obtained using a third ultrasonic sensor of the machine;

determining that the third sensor data indicates a third object detection associated with a third distance from the machine; and refraining, based at least on the third distance being outside of the threshold distance to the first distance, from associating the third object detection with the group.

4. The method of claim 1, wherein the first sensor data includes a first primary measurement and the second sensor data includes a second primary measurement, and wherein the method further comprises:

obtaining third sensor data obtained using at least one of the first ultrasonic sensor or the second ultrasonic sensor, the third sensor data including a secondary measurement;

determining that the third sensor data indicates a third object detection associated with a third distance from the machine; and determining, based at least on the third distance being within the threshold distance to the first distance, to associate the third object detection with the group, wherein the determining the location associated with the object further uses the third object detection.

5. The method of claim 1, further comprising:

determining, based at least on the first sensor data indicating a third object detection associated with a third distance from the machine, to associate the third object detection with a second group corresponding to a second object;

determining that the second sensor data indicates a fourth object detection associated with a fourth distance from the machine;

determining, based at least on the fourth distance being within the threshold distance to the third distance, to associate the fourth object detection with the second group; and determining, based at least on the second group and using at least the third object detection and the fourth object detection, a second location associated with the second object, wherein the causing the machine to perform one or more operations is further based at least on the second location associated with the second object.

6. The method of claim 1, wherein the determining the location associated with the object comprises determining, based at least on the group and processing the first object detection and the second object detection using one or more trilateration algorithms, the location associated with the object.

7. A system comprising:

one or more processors to:

obtain first sensor data obtained using a first sensor of a machine and second sensor data obtained using a second sensor of the machine;

determine that the first sensor data indicates a first object detection at a first distance;

determine that the second sensor data indicates a second object detection at a second distance that is within a threshold distance to the first distance;

determine, based at least on the second distance being within the threshold distance to the first distance and using the first object detection and the second object detection, a location associated with an object; and cause performance of one or more operations based at least on the location associated with the object.

8. The system of claim 7, wherein the one or more processors are further to:

generate, based at least on the first sensor data indicating the first object detection, a group corresponding to the object;

associate at least one of the first sensor data or the first object detection with the group, and associate, based at least on the second distance being within the threshold distance to the first distance, at least one of the second sensor data or the second object detection with the group, wherein the determination of the location associated with the object is based at least on the group.

9. The system of claim 7, wherein the one or more processors are further to:

determine that the second sensor includes a next sensor to analyze after the first sensor, wherein the determination that the second sensor data indicates the second object detection at the second distance that is within the threshold distance to the first distance is based at least on the second sensor including the next sensor to analyze after the first sensor.

10. The system of claim 9, wherein the determination that the second sensor includes the next sensor to analyze after the first sensor is based at least on one or more of:

an order associated with sensors of the machine, the order indicating that the second sensor includes the next sensor to analyze after the first sensor; or the second sensor including a neighboring sensor to the first sensor.

11. The system of claim 7, wherein the one or more processors are further to:

obtain third sensor data obtained using a third sensor of the machine;

determine that the third sensor data indicates a third object detection at a third distance that is outside of the threshold distance to the first distance; and based at least on the third distance being outside of the threshold distance to the first distance, refrain from using the third object detection for the determination of the location associated with the object.

12. The system of claim 7, wherein the first sensor data includes a first main measurement and the second sensor data includes a second main measurement, and wherein the one or more processors are further to:

obtain third sensor data obtained using at least one of the first sensor or the second sensor, the third sensor data including a secondary measurement; and determine that the third sensor data indicates a third object detection at a third distance that is within the threshold distance to the first distance, wherein the determination of the location associated with the object further uses the third object detection based at least on the third distance being within the threshold distance to the first distance.

13. The system of claim 7, wherein the one or more processors are further to:

obtain third sensor data obtained using a third sensor of the machine; and determine that the third sensor data indicates a third object detection at a third distance that is within the threshold distance to the first distance, wherein the determination of the location associated with the object further uses the third object detection based at least on the third distance being within the threshold distance to the first distance.

14. The system of claim 7, wherein the one or more processors are further to:

obtain third sensor data obtained using a third sensor of the machine;

determine that the second sensor data indicates a third object detection at a third distance;

determine that the third sensor data indicates a fourth object detection at a fourth distance that is within the threshold distance to the third distance; and determine, based at least on the fourth distance being within the threshold distance to the third distance and using the third object detection and the fourth object detection, a second location associated with a second object, wherein the performance of one or more operations is further caused based at least on the second location associated with the second object.

15. The system of claim 7, wherein the one or more processors are further to:

associate, based at least on the second distance being within the threshold distance to the first distance, at least the first object detection and the second object detection with a group corresponding to the object; and determine that the group includes at least one of more than a first threshold number of object detections or less than a second threshold number of object detections, wherein the determination of the location associated with the object is based at least on the group including at least one of more than the first threshold number of object detections or less than the second threshold number of object detections.

16. The system of claim 7, wherein the determination of the location associated with the object comprises determining, based at least on the second distance being within the threshold distance to the first distance and processing the first object detection and the second object detection using one or more trilateration algorithms, the location associated with the object.

17. The system of claim 7, wherein the performance of the one or more operations comprises at last one of:

generating a map indicating at least the location associated with the object; or causing the machine to navigate based at least on the location associated with the object.

18. The system of claim 7, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more visual language models (VLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

19. One or more processors comprising:

processing circuitry to cause performance of one or more operations of a machine based at least on a location associated with an object, wherein the location associated with the object is determined based at least on associating a first object detection determined using a first ultrasonic sensor of the machine with a second object detection determined using a second ultrasonic sensor of the machine, the associating being based at least on at least one of a first location of the first ultrasonic sensor with respect to a second location of the second ultrasonic sensor or a first distance associated with the first object detection with respect to a second distance associated with the second object detection.

20. The one or more processors of claim 19, wherein the one or more processors are comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more visual language models (VLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *